(12) United States Patent
Tai

(10) Patent No.: US 6,867,712 B2
(45) Date of Patent: Mar. 15, 2005

(54) REELABLE KEYBOARD

(76) Inventor: Fu Chen Tai, No. 67, Lane. 598, Sec. 2, Yuan Chi Rd., She Tou Hsiang, Chang Hua Hsien (TW)

( * ) Notice: Subject to any disclaimer, the term of this patent is extended or adjusted under 35 U.S.C. 154(b) by 459 days.

(21) Appl. No.: 10/166,007

(22) Filed: Jun. 11, 2002

(65) Prior Publication Data

US 2003/0227396 A1 Dec. 11, 2003

(51) Int. Cl.[7] .................. H03K 17/94; H03M 11/00
(52) U.S. Cl. .................. 341/22; 345/168; 361/680
(58) Field of Search .................. 341/22; 345/168; 361/680, 724, 725

(56) References Cited

U.S. PATENT DOCUMENTS 6,265,993 B1 * 7/2001 Johnson ................. 341/22
6,655,863 B2 * 12/2003 Lin ....................... 400/491
2003/0048256 A1 * 3/2003 Salmon .................. 345/168

* cited by examiner

*Primary Examiner*—Timothy Edwards, Jr.
(74) *Attorney, Agent, or Firm*—Rosenberg, Klein & Lee

(57) ABSTRACT

A reelable keyboard, which includes a soft keyboard, a first shell body, and a second shell body. The soft keyboard is connected between the first shell body and the second shell body. The first shell body has a winding mechanism therein used to wind up the soft keyboard. A positioning button disposed on the first shell body is used to control whether the soft keyboard is pulled out from or is wound into the first shell body. When the keyboard is to be used, it is only necessary to pull out the soft keyboard from the first shell body. When not in use, the soft keyboard is wound in the first shell body. Thereby, the volume of the keyboard can be effectively shrunk to facilitate portability.

15 Claims, 5 Drawing Sheets

REELABLE KEYBOARD

FIELD OF THE INVENTION

The present invention relates to a reelable keyboard and, more particularly, to a keyboard capable of being wound to shrink the volume when not in use.

BACKGROUND OF THE INVENTION

Along with continual progress of scientific technology, computer techniques evolve vigorously. Computers have gone deeply into everyday lives of people, and become inevitable tools. When operating computers, people almost use keyboards to perform working instructions of relative operations and solve problems.

In order to meet the requirements of powerful functions and other services of computers, various kinds of function keys like an escape key, a tab key, a Caps Lock key, a Space key, an Enter key, arrow keys, numeric keys, a Num Lock key, a Back Space key, and other special keys are disposed on a conventional keyboard. Therefore, the length of a common keyboard ought to be large enough to accommodate the above keys, resulting in a larger occupied space. Moreover, because the conventional keyboard is longer, it cannot be effectively stored up to reduce the occupied space when a computer is not in use. Besides, it is inconvenient for one to bring the keyboard along.

Accordingly, the above computer keyboard has inconvenience and drawbacks in practical use. The present invention aims to resolve the problems in the prior art.

SUMMARY OF THE INVENTION

The primary object of the present invention is to provide a reelable keyboard, which uses a winding mechanism to wind a soft keyboard so as to effectively shrink the volume of the keyboard when not in use and facilitate portability.

Another object of the present invention is to provide a reelable keyboard, wherein a soft keyboard is received in a shell body to effective prevent the soft keyboard from damage.

To achieve the above objects, the present invention provides a reelable keyboard, which comprises a soft keyboard, a first shell body, and a second shell body. The first shell body has a winding mechanism, which is connected at one side of the soft keyboard, and can wind up the soft keyboard. The second shell body is connected at the other side of the soft keyboard.

The various objects and advantages of the present invention will be more readily understood from the following detailed description when read in conjunction with the appended drawing, in which:

DETAILED DESCRIPTION OF THE PREFERRED EMBODIMENTS

Figure 1:
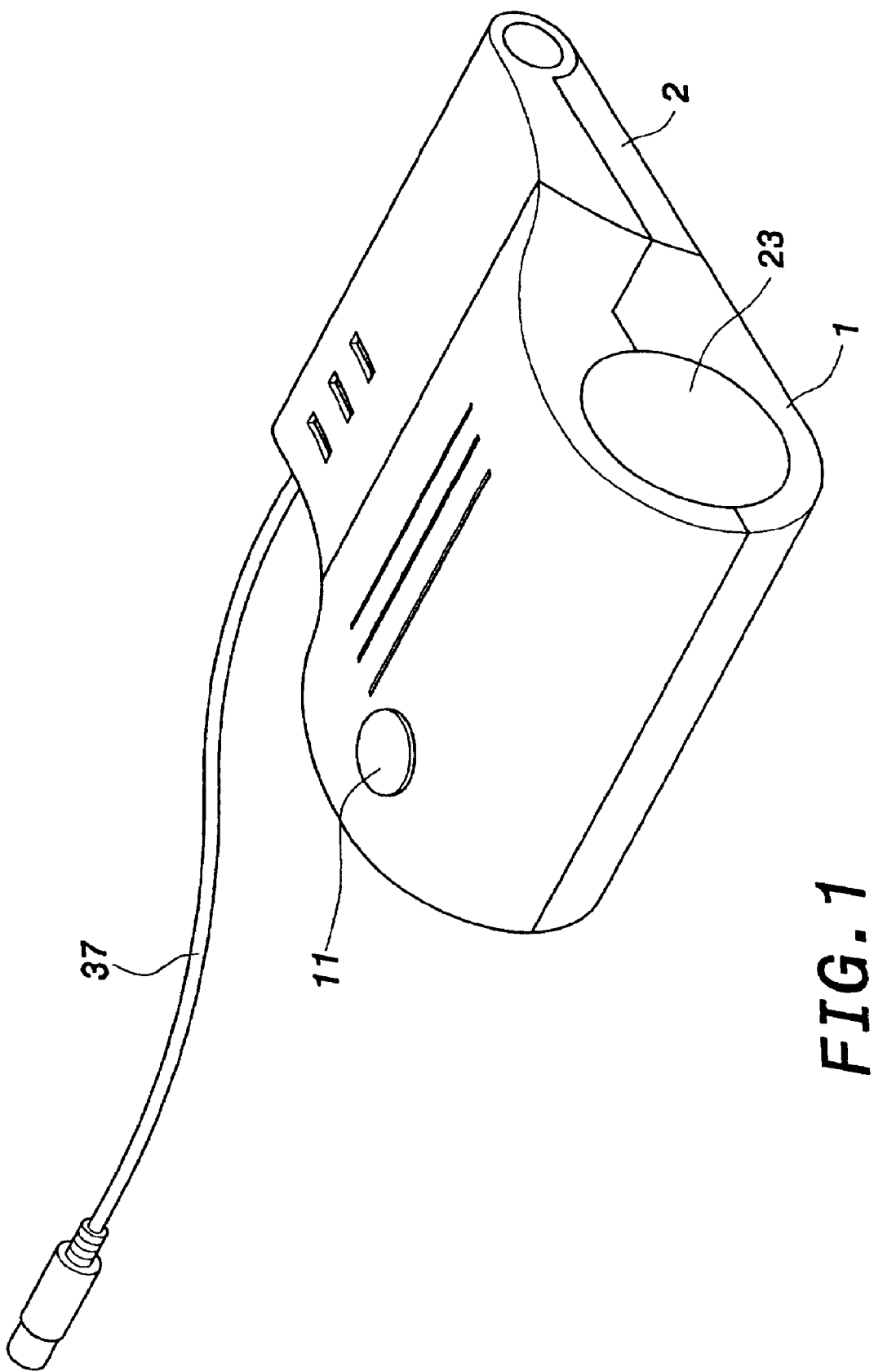
FIG. 1 is a perspective view of the present invention.
Figure 2:
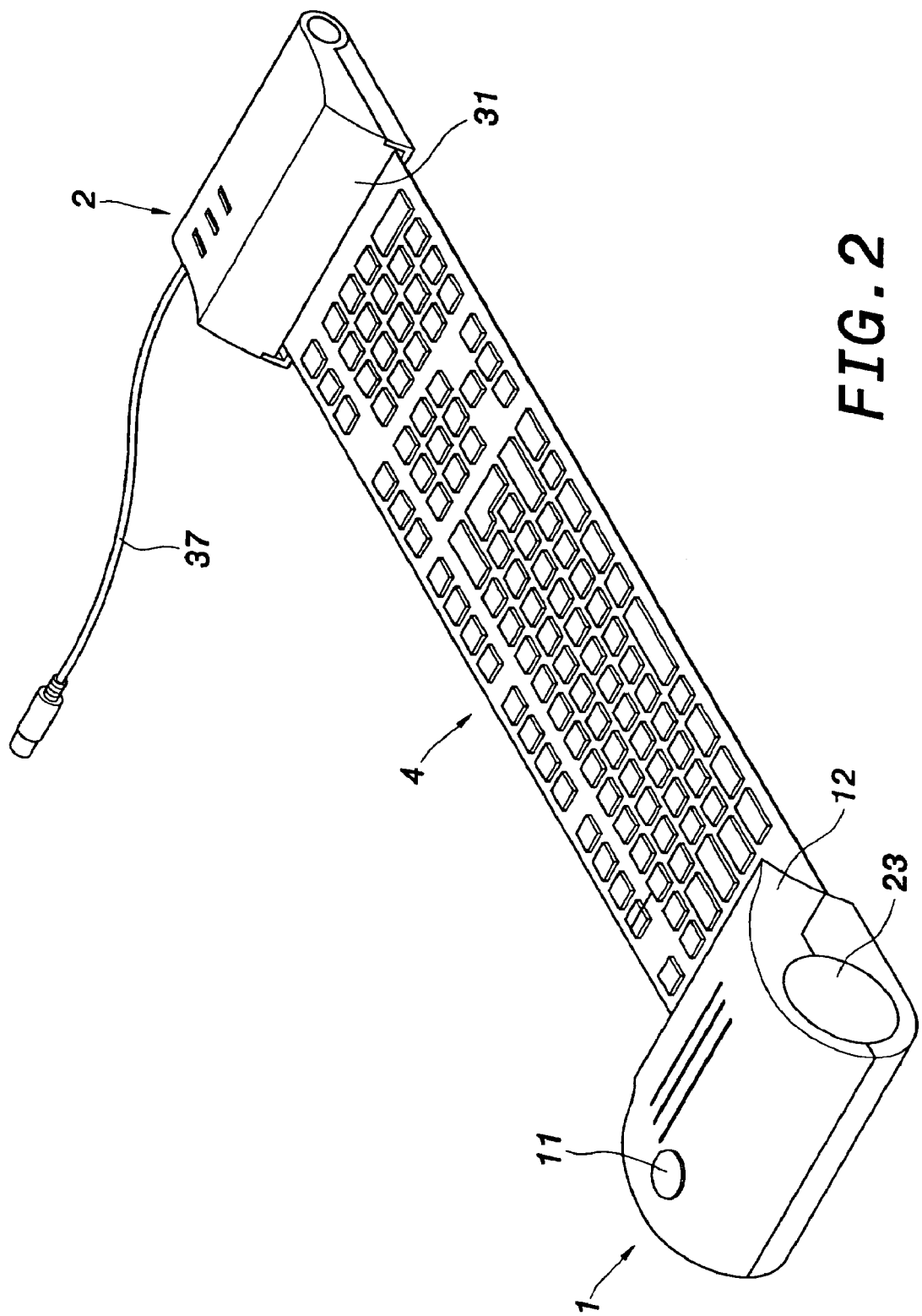
FIG. 2 is a diagram of an unfolded keyboard of the present invention.

As shown in FIGS. 1 to 4, the present invention provides a reelable keyboard, which can be wound up to reduce the occupied space when not in use, and can be pulled out for use afterwards. The reelable keyboard of the present invention comprises a first shell body 1, a second shell body 3, and a soft keyboard 4.

The soft keyboard 4 is formed by stacking several thin-film circuits (not shown) up and down to have flexibility. Two sides of the soft keyboard 4 are connected with the first shell body 1 and the second shell body 3, respectively. The first shell body 1 has a winding mechanism 2 therein. The winding mechanism 2 is connected at one side of the soft keyboard. A positioning button 11 disposed on the first shell body 1 is used to control whether the soft keyboard 4 is to be pulled out of the first shell body 1 or wound around the winding mechanism 2. A first joint face 12 is formed at one side of the second shell body 3. When the soft keyboard 4 is wound in the first shell body 1, the first joint face 12 can be tightly stuck with a second joint face 31.

The winding mechanism 2 comprises a reel 21, a torsion spring 22, a fixing lid 23, and a rotary lid 24. Because the hollow pivotal hole of the reel 21 has a flat abutting face 212, it becomes a noncircular deformed pivotal hole 211. The flat abutting face 212 has a cut groove 213 thereon used to fix one side of the soft keyboard 4. The torsion spring 22 is slipped into the reel 21. A ringed projective portion 221 is formed at the left end section of the torsion spring 22. The projective portion 221 is flatly stuck with the flat abutting face 212.

An embedding portion 231 is disposed at one side of the fixing lid 23. The embedding portion 231 is fixedly embedded in a gap 13 at one side of the first shell body 1 to form a fixed end. A first slipping post 232 is formed at one side of the embedding portion. One side of the reel 21 is slipped onto the first slipping post 232. A breach 233 is also formed on the first slipping post 232. The breach 233 laps a parallel shape formed at one side of the torsion spring 22 in the reel 21 so that one side of the torsion spring 22 can be fixedly connected with the first slipping post 232.

The rotary lid 24 has a central ring 241. A circular plane 242 is formed at one side of the central ring 241. The central ring 241 abuts on a gap 14 at one side of the first shell body 1 to form a free end. A second slipping post 243 at one side of the circular place 242 is slipped into the reel 21. The rotary lid 24 can be led to rotate when the reel 21 rotates. Meanwhile, the fixing lid 23 is stationary. A locking hole 244 is formed at one side of the circular plane 242. The locking hole 244 is locked with a locking component 15. The locking component 15 and a fixing component 111 below the positioning button 11 are connected and assembled using two reeving components 16 and a restoring spring 17. Elasticity of the restoring spring 17 is exploited to restore the positioning button 11 back to the original position after the positioning button is pressed.

Figure 3:
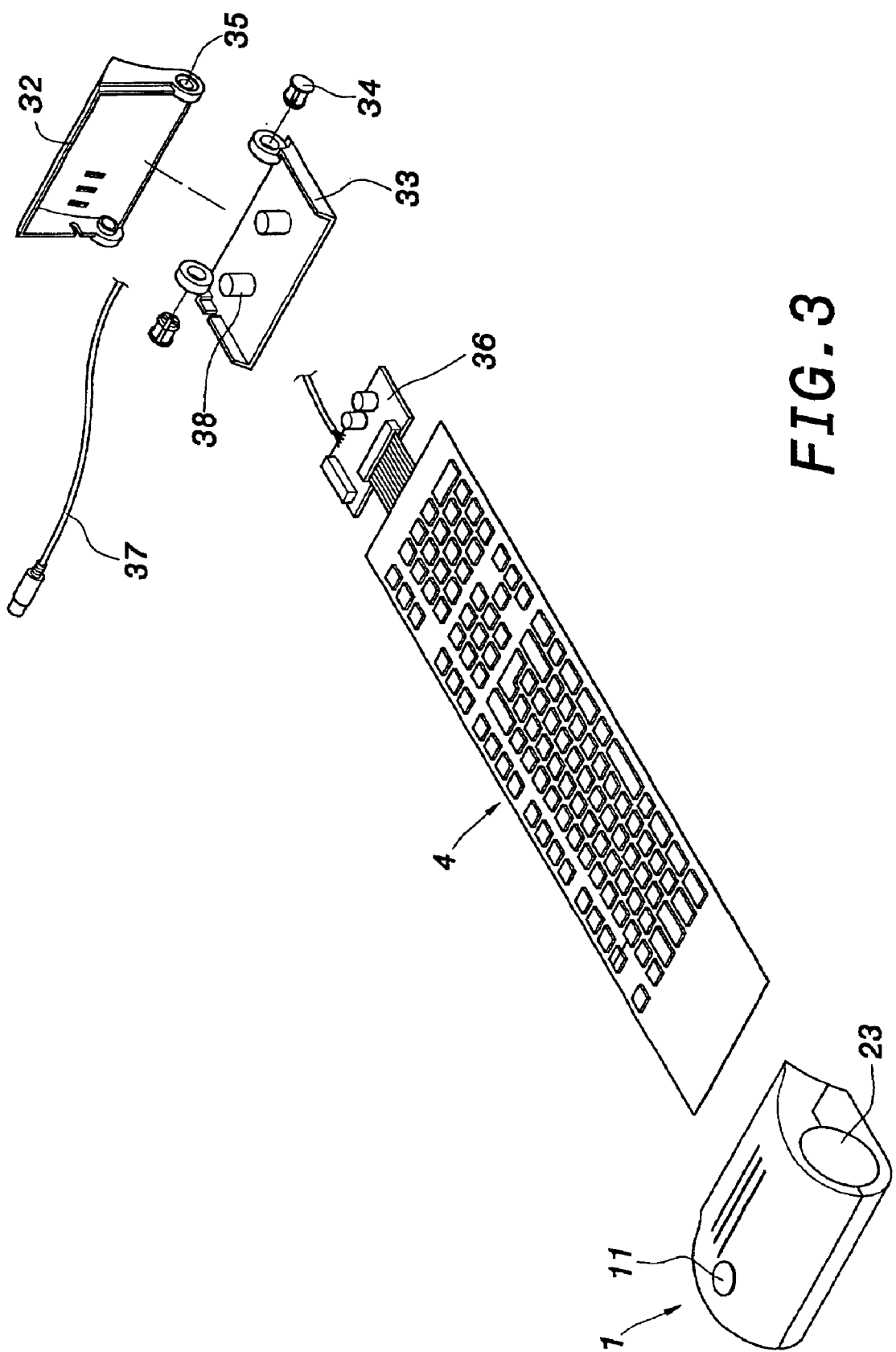
FIG. 3 is an exploded perspective view of the present invention.
Figure 4:
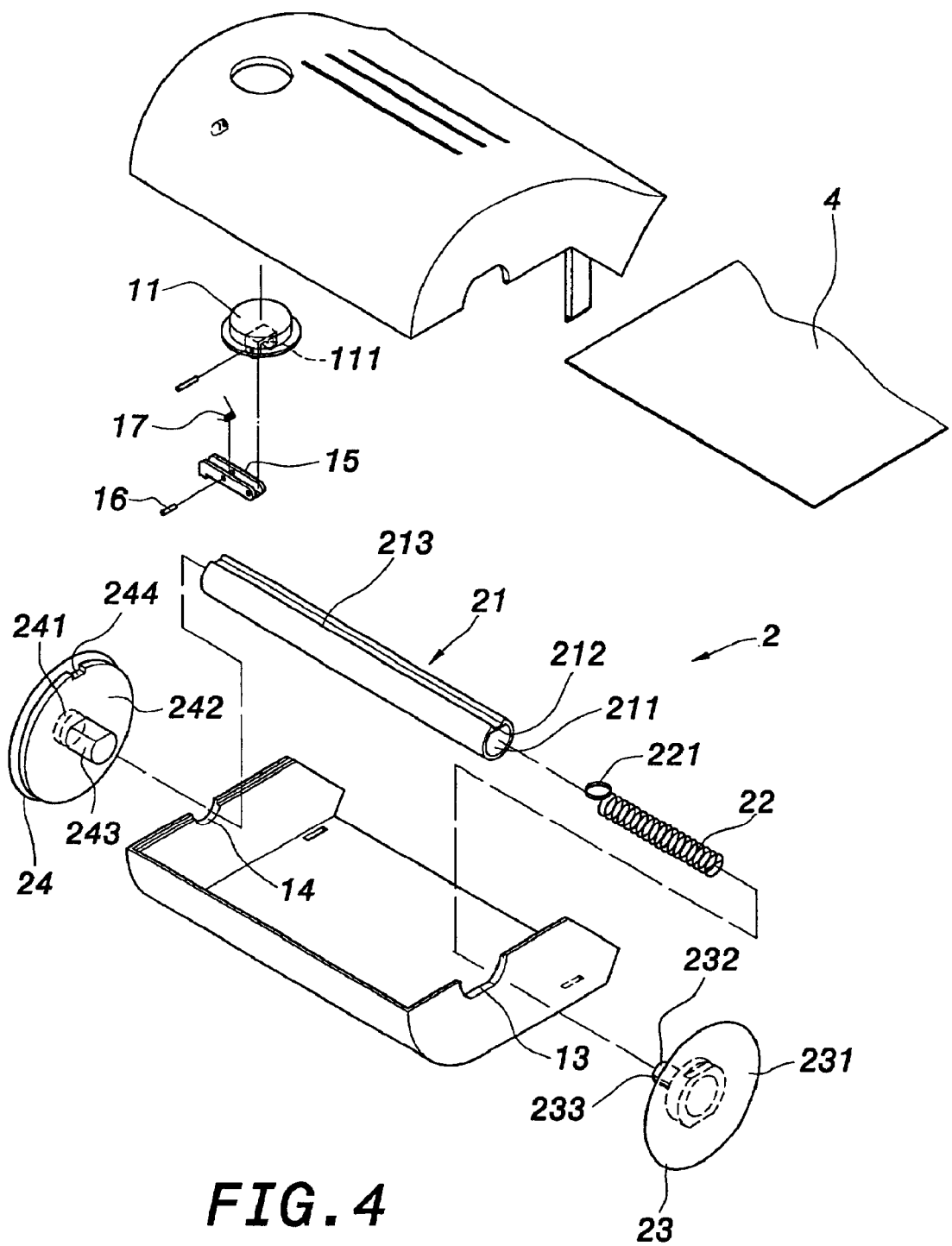
FIG. 4 is an exploded perspective view of a winding mechanism in a first shell body of the present invention.

The second shell body 3 is composed of a top plate 32 and a bottom plate 33 (shown in FIG. 3). A bolt 34 is inserted into insertion holes 35 of the top plate 32 and the bottom plate 33 for connection so that they can be opened or closed with respect to each other. A circuit board 36 connected with the soft keyboard 4 is disposed in the second shell body 3. The circuit board 36 is used to control the soft keyboard 4. A connection cable 37 is disposed at one side of the circuit board 36. The connection cable 37 is exposed out of the second shell body 3 when the soft keyboard 4 is in use. The connection cable 37 is wound around a fixing post 38 in the second shell body 3 to avoid the problem of entanglement when the soft keyboard 4 is wound in the first shell body 1 and not in use.

Figure 5:
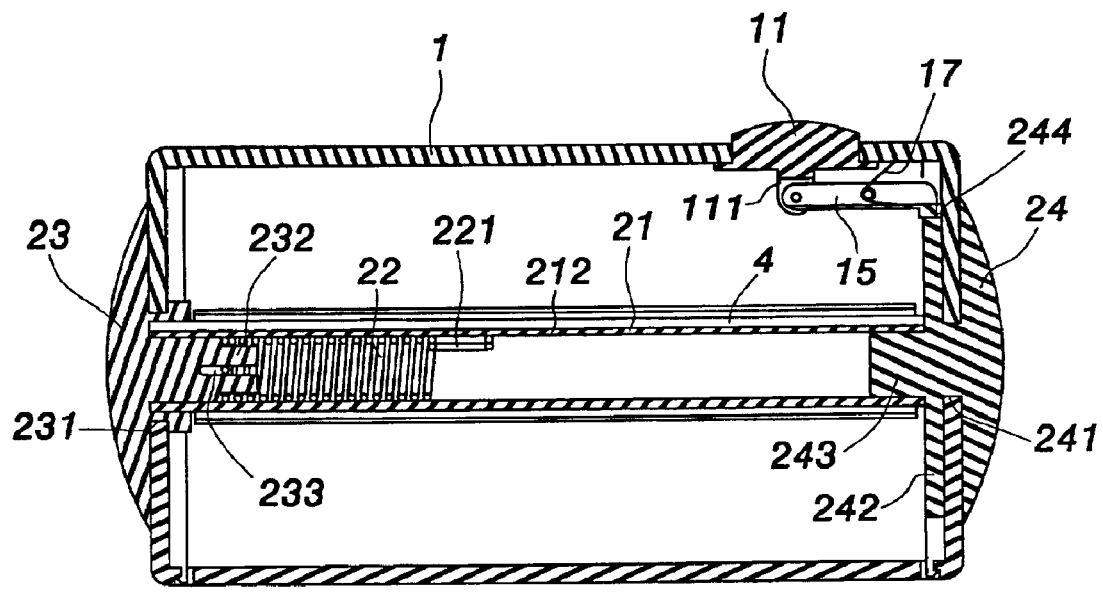
FIG. 5 is a cross-sectional view showing a keyboard is pulled out of a winding mechanism of the present invention.
Figure 6:
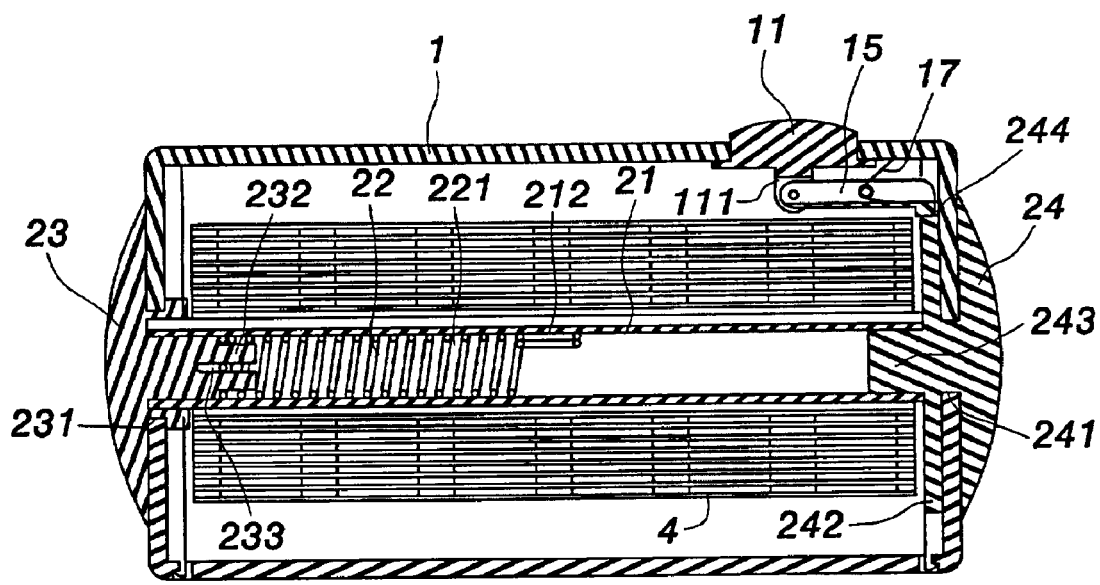
FIG. 6 is a cross-sectional view showing a keyboard is wound around a winding mechanism of the present invention.

As shown in FIGS. 5 and 6, when the soft keyboard 4 is pulled out, the reel 21 is led to rotate. Because one end of the torsion spring 22 is fixedly connected with the first slipping post 232, and the other end thereof abuts against the flat abutting face 212, the torsion spring 22 will elastically wind. Simultaneously, because the locking component 15 is locked in the locking hole 244, a restoring force (shown in FIG. 5) is stored in the torsion spring. When the soft keyboard 4 is wound around the winding mechanism 2 (shown in FIG. 6), the positioning button 11 is pressed to release the restoring force of the torsion spring 22 to let the reel 21 rotate in the reverse direction so as to wind up the soft keyboard 4, thereby winding the soft keyboard 4 into the first shell body 1.

To sum up, the reelable keyboard of the present invention has the following characteristics.

1. The soft keyboard can be wound in the first shell body to shrink the volume and occupy less space.

2. The winding mechanism has a torsion spring, which provides an elastic torsion to conveniently wind up or pull out the soft keyboard.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A reelable keyboard comprising:
   a soft keyboard;
   a first shell body having a winding mechanism, said winding mechanism being connected at one side of said soft keyboard to wind up said soft keyboard; and
   a second shell body connected at the other side of said soft keyboard.

2. The reelable keyboard as claimed in claim 1, wherein said soft keyboard is flexible.

3. The reelable keyboard as claimed in claim 1, wherein said second shell body is composed of a top plate and a bottom plate, bolts are inserted into insertion holes of said top plate and said bottom plate for connection so that they can be opened or closed with respect to each other.

4. The reelable keyboard as claimed in claim 1, wherein said first shell body and said second shell body have a first joint face and a second joint face, respectively.

5. The reelable keyboard as claimed in claim 4, wherein said first joint face and said second joint face are tightly stuck together when said soft keyboard is wound in said first shell body.

6. The reelable keyboard as claimed in claim 1, wherein a circuit board connected with said soft keyboard is disposed in said second shell body.

7. The reelable keyboard as claimed in claim 6, wherein one side of said circuit board has a connection cable.

8. The reelable keyboard as claimed in claim 7, wherein said second shell body has a fixing post therein to be wound around by said connection cable.

9. The reelable keyboard as claimed in claim 1, wherein said first shell body has a positioning button thereon to control whether said soft keyboard is to be pulled out of said first shell body or wound in said winding mechanism, said winding mechanism comprising:
   a reel whose hollow pivotal hole has a flat abutting face, said hollow pivotal hole being a noncircular deformed pivotal hole;
   a torsion spring slipped into said reel, a projective portion being formed at one end face of said torsion spring, said projective portion being flatly stuck with said flat abutting face;
   a fixing lid having an embedding portion at one side thereof, said embedding portion being fixedly embedded at one side of said first shell body to form a fixed end, one side of said embedding portion having a first slipping post, one side of said reel being slipped onto said first slipping post, a breach being formed on said first slipping post; and
   a rotary lid having a central ring, one side of said central ring having a circular plane, one side of said circular plane having a second slipping post, one side of said reel being slipped onto said second slipping post, said rotary lid being led to rotate when said reel rotates.

10. The reelable keyboard as claimed in claim 9, wherein a cut groove fixed with one side of said soft keyboard is formed on said flat abutting face.

11. The reelable keyboard as claimed in claim 9, wherein said projective portion is ring-shaped.

12. The reelable keyboard as claimed in claim 9, wherein a parallel shape is formed at one side of said torsion spring to lap said breach.

13. The reelable keyboard as claimed in claim 9, wherein one side of said circular plane has a locking hole.

14. The reelable keyboard as claimed in claim 13, wherein a locking component is disposed below said positioning button, and said locking component is locked into said locking hole.

15. The reelable keyboard as claimed in claim 14, wherein a fixing component is disposed below said positioning button, said locking component and said fixing component are connected and assembled together using two reeving components and a restoring spring, elasticity of said restoring spring is exploited to restore said positioning button back to its original position after said positioning button is pressed.

* * * * *